United States Patent [19]

Shipman, Jr.

[11] Patent Number: 5,467,361
[45] Date of Patent: Nov. 14, 1995

[54] METHOD AND SYSTEM FOR SEPARATE DATA AND MEDIA MAINTENANCE WITHIN DIRECT ACCESS STORAGE DEVICES

[75] Inventor: Lloyd R. Shipman, Jr., San Jose, Calif.

[73] Assignee: International Business Machines Corporation, Armonk, N.Y.

[21] Appl. No.: 263,895

[22] Filed: Jun. 20, 1994

[51] Int. Cl.⁶ .................................................. H03M 13/00
[52] U.S. Cl. ........................................ 371/40.1; 371/46.4

[56] References Cited

U.S. PATENT DOCUMENTS

| | | |
|---|---|---|
| 3,964,056 | 6/1976 | Charpentier et al. . |
| 4,092,732 | 5/1978 | Ouchi . |
| 4,608,688 | 8/1986 | Hansen et al. . |
| 4,667,326 | 5/1987 | Young et al. . |
| 4,761,785 | 8/1988 | Clark et al. ............................ 371/38.1 |
| 4,825,403 | 4/1989 | Gershenson et al. . |
| 4,942,579 | 7/1990 | Goodlander et al. . |
| 4,993,030 | 2/1991 | Krakaner et al. . |
| 5,051,887 | 9/1991 | Berger et al. . |
| 5,058,115 | 10/1991 | Blake et al. ........................... 371/40.1 |
| 5,072,378 | 12/1991 | Monka ................................... 371/40.1 |
| 5,140,592 | 8/1992 | Idleman et al. . |
| 5,283,791 | 2/1994 | Halford ................................. 371/40.1 |

OTHER PUBLICATIONS

D. Patterson et al., "A Case for Redundant Arrays of Inexpensive Disks (RAID)" pp. 109–116.
Garth A. Gibson, "Performance and Reliability in Redundant Arrays of Inexpensive Disks", pp. 381–391.
The Interpreter "Competition Heats Up in Growing Fault–Tolerant Computer Marker", Mini–Micro Systems, Jan. 1994.
James A. Katzman, Tandem Computers "The Tandem 16: A Fault–Tolerant Computing System", Chapter 29, 1977, pp. 470–485.

Primary Examiner—Roy N. Envall, Jr.
Assistant Examiner—Thomas E. Brown
Attorney, Agent, or Firm—Esther Klein; Andrew J. Dillon

[57] ABSTRACT

The present application may be utilized for enhanced maintenance of data stored on storage media within a data processing system storage subsystem. Data to be stored is first subdivided into multiple blocks and subblocks, segments or tracks. Each subdivision of data is then analyzed and appropriate logical Error Correction Codes (ECC) are calculated and inserted into the data at selected locations to permit certain data errors to be corrected by subsequent processing. Thereafter, the data and associated logical Error Correction Codes (ECC) are then coupled to a head/disk assembly within a storage subsystem. A physical Error Correction Code (ECC) logic circuit is then utilized to analyze the data and logical Error Correction Codes (ECC) and appropriate physical Error Correction Codes (ECC) are then calculated and inserted into the data at selected locations in response to the storage of the data and logical Error Correction Codes (ECC) within the storage media. Maintenance of the storage media and data may then be separately accomplished utilizing independent logical and physical Error Correction Code (ECC) circuits which operate separately upon the logical and physical Error Correction Codes (ECC) wherein media defects will not necessarily result in a loss of all data present within the defective media segment.

14 Claims, 5 Drawing Sheets

METHOD AND SYSTEM FOR SEPARATE DATA AND MEDIA MAINTENANCE WITHIN DIRECT ACCESS STORAGE DEVICES

BACKGROUND OF THE INVENTION

1. Technical Field

The present invention relates in general to an improved data processing system and in particular to an improved data storage subsystem for use with a data processing system. Still more particularly, the present invention relates to an improved method and system for maintaining data accuracy for data stored within a direct access storage device.

2. Description of the Related Art

Modern computer systems often use a plurality of storage devices or memories in order to store data associated with that computer. Many such storage devices are categorized as so-called "direct access storage devices" (DASD) in that the access time for data within such a device is effectively independent of the location of the data. One example of such a storage device is a magnetic disk drive memory.

In systems which utilize such memory devices, accuracy in maintenance of the data stored therein is of particular importance. The writing and reading of data to such devices carries with it an associated probability of error. Procedures and devices have been developed which can detect and, in some cases, correct the errors which occur during the reading and writing of data to such disks. For example, with respect to a commonly utilized disk drive memory system, the disk is divided into a plurality of sectors, each sector having the same, predetermined size. Each sector has a particular header field which gives the sector a unique address, a header field code which allows for the detection of errors in the header field, a data field of variable length and, so-called Error Correction Codes (ECC) which allow for the detection and correction of errors within the data.

Thus, when a magnetic storage disk has been written to, the disk controller reads the header field and header field code. If the sector designated is the desired sector and no header field error is detected, the new data for that sector is written into the data field and new data ECC is calculated and written into the ECC field.

While such systems function admirably, there occur situations periodically where the magnetic storage media for a direct access storage device requires remedial action due to errors attributable to the physical state of the media. When such remedial action has been complete, a typical result is that more data is lost than was originally damaged or affected within a defective track sector, block or other addressable memory segment. Thus, while such systems are highly efficient in detecting errors within individual addressable portions of a magnetic storage media the loss of data within that section may be unnecessarily large.

Alternately, upon completion of the remedial action, a subsequent read of the contents of that addressable memory segment may result in the transfer of some data content with no error indication, even though the data actually transferred is unrelated to the data which was present prior to the remedial action.

Thus, is should be apparent that a need exists for an Error Correction Code (ECC) system which permits the data within a track sector, block or segment to be maintained separate from the physical media within which the data is stored.

SUMMARY OF THE INVENTION

It is therefore one object of the present invention to provide an improved data processing system.

It is another object of the present invention to provide an improved data storage subsystem for utilization within a data processing system.

It is yet another object of the present invention to provide an improved method and system for maintaining data accuracy for data stored within a direct access storage device.

The foregoing objects are achieved as is now described. The method and system of the present application may be utilized for enhanced maintenance of data stored on storage media within a data processing system storage subsystem. Data to be stored is first subdivided into multiple blocks and subblocks, segments or tracks. Each subdivision of data is then analyzed and appropriate logical Error Correction Codes (ECC) are calculated and inserted into the data at selected locations to permit certain data errors to be corrected by subsequent processing. Thereafter, the data and associated logical Error Correction Codes (ECC) are then coupled to a head/disk assembly within a storage subsystem. A physical Error Correction Code (ECC) logic circuit is then utilized to analyze the data and logical Error Correction Codes (ECC) and appropriate physical Error Correction Codes (ECC) are then calculated and inserted into the data at selected locations in response to the storage of the data and logical Error Correction Codes (ECC) within the storage media. Maintenance of the storage media and data may then be separately accomplished utilizing independent logical and physical Error Correction Code (ECC) circuits which operated separately upon the logical and physical Error Correction Codes (ECC) wherein media defects will not necessarily result in a loss of all data present within the defective media segment.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
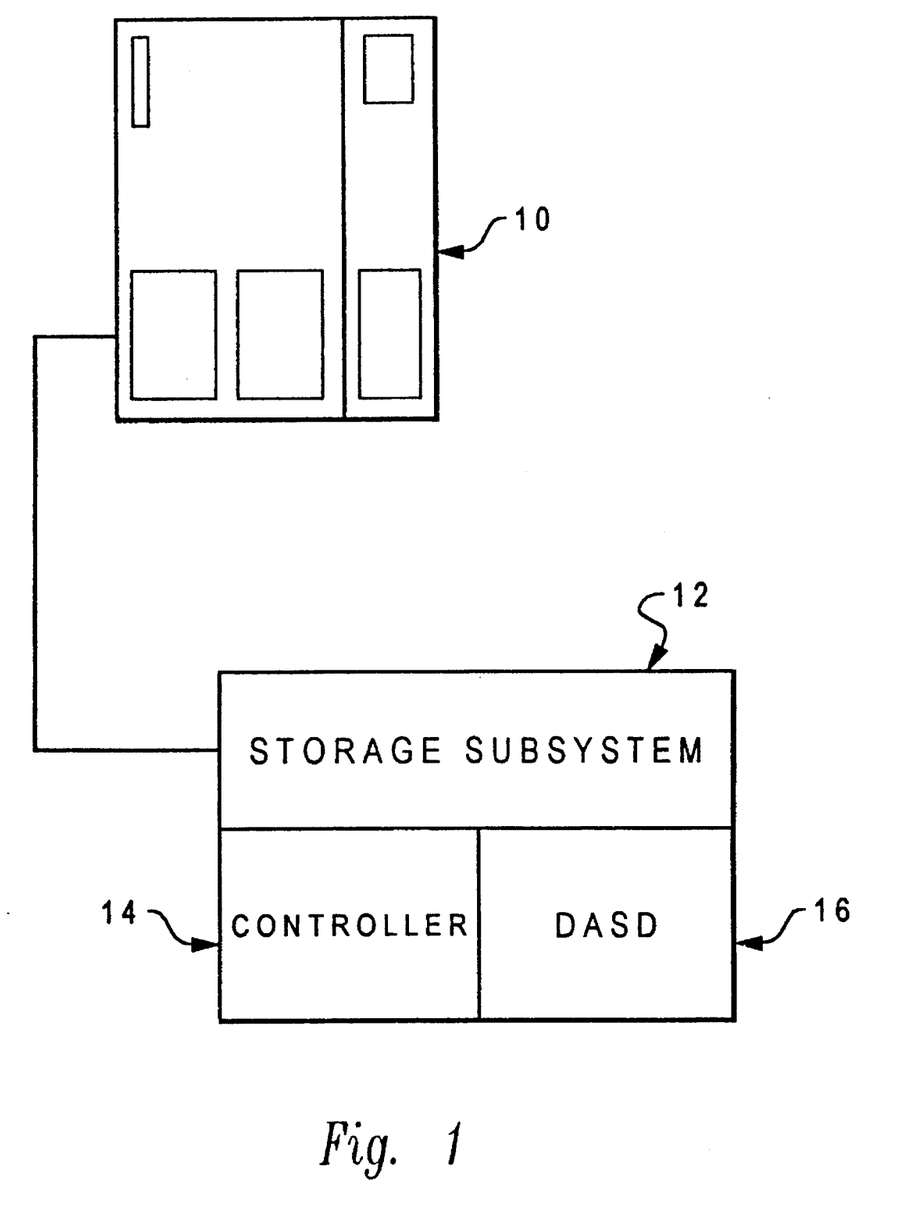
FIG. 1 is a partially schematic pictorial representation of a data processing system which may be utilized to implement the method and system of the present invention.

With reference now to the figures and in particular with reference to FIG. 1, there is depicted a partially schematic pictorial representation of a data processing system which may be utilized to implement the method and system of the present invention. As illustrated, the data processing system includes a host processor 10 which may be implemented utilizing any suitable computer such as, for example, the International Business Machines AS/400 computer. Additionally, a storage subsystem 12 is shown coupled to host processor 10. As is common in such storage subsystems a controller 14 and one or more direct access storage devices 16 are also illustrated within storage system 12. Thus, in manner which should be apparent to those having ordinary skill in the art, data utilized by host processor 10 may be stored and retrieved from one or more direct access storage devices within storage subsystem 12.

Figure 2:
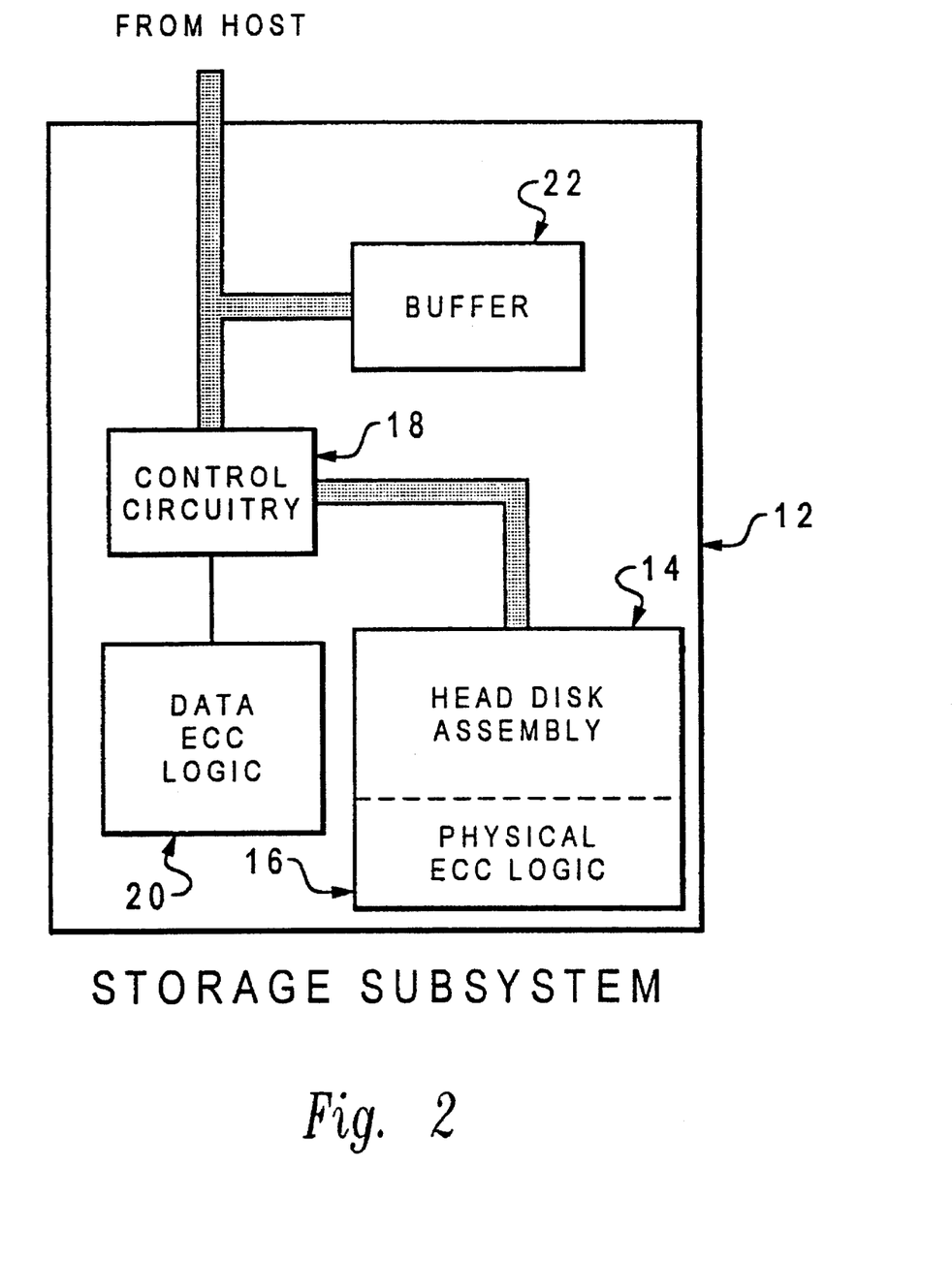
FIG. 2 is a high level block diagram of the storage subsystem of the data processing system of FIG. 1, which may be utilized to implement the method and system of the present invention.

Referring now to FIG. 2, there is depicted a high level block diagram of the storage subsystem 1 of the data processing system of FIG. 1. As illustrated, storage subsystem 12 preferably includes one or more head-disk assemblies 14 which each have associated therewith a physical Error Correction Code (ECC) logic circuit, such as physical Error Correction Code (ECC) logic circuit 16. As those skilled in the art appreciate upon reference to this disclosure, standard head/disk assemblies which conform to the Small Computer Standard Interface (SCSI) typically utilize a physical Error Correction Code (ECC) logic circuit which is transparent to the control circuitry of a storage subsystem. That is, in the manner described above, Error Correction Codes (ECC) which are external to the individual controllers are inserted into the data as the data is written to the disk and utilized internally within the head-disk assembly to generate an indication and possibly correct errors within the data. One such technique is the so-called "Reed-Solomon" error detection code. "Practical Error Correction Design for Engineers", published by Data Systems Technology Corp., Broomfield, Colo. describes such a technique.

Additionally, in accordance with an important feature of the present invention, storage subsystem 12 preferably includes a data Error Correction Code (ECC) logic circuit 20 which is coupled to control circuitry 18. Data Error Correction Code (ECC) logic circuit 20 is utilized to calculate and insert appropriate Error Correction Codes (ECC) for individual blocks, subblocks, segments, tracks or the like of data prior to the storage of that data within head/disk assembly 14. Thus, as should be apparent from this description, data which is coupled from control circuitry 18 to head/disk assembly 14 for storage will include both actual data and logical Error Correction Codes (ECC) which are created utilizing data Error Correction Code (ECC) logic circuit 20. Additionally, a buffer 22 is also provided within storage subsystem 12 and buffer 22 is preferably utilized for the temporary storage of data which is to be written to or read from storage subsystem 12.

Figure 3:
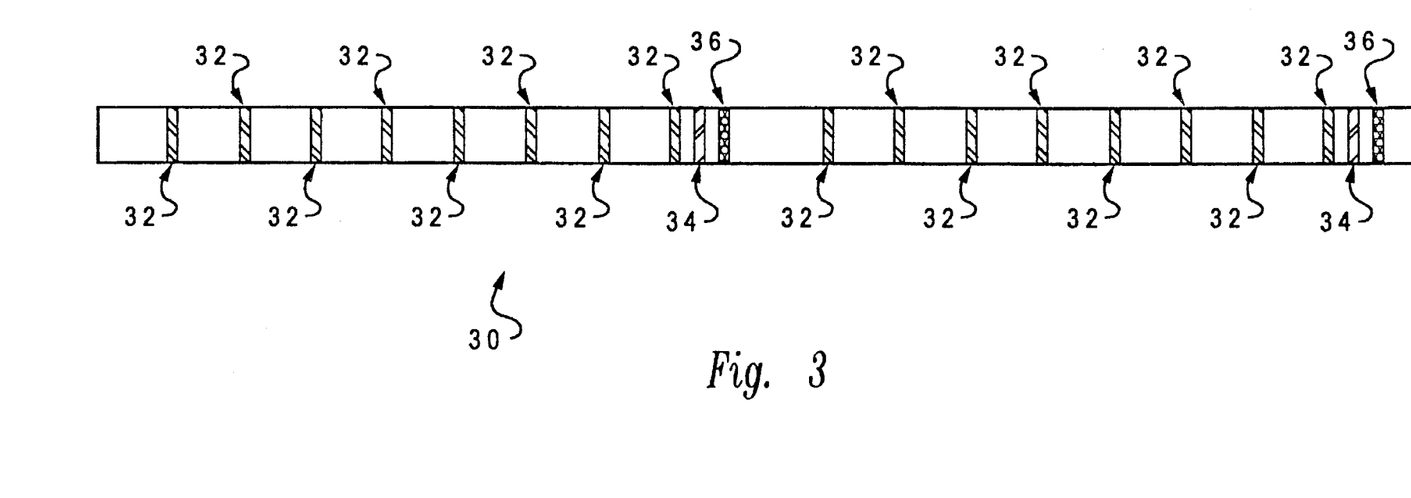
FIG. 3 is a pictorial representation of the presence of two types of Error Correction Codes (ECC) within a data segment in accordance with the method and system of the present invention.

With reference now to FIG. 3, there is depicted a pictorial representation of the presence of two types of Error Correction Codes (ECC) within a data segment in accordance with the method and system of the present invention. As those skilled in the art will appreciate upon reference to the foregoing data segment 30 comprises a linear address space which, in dependence upon the type of storage system utilized, may comprise a track segment, block or other appropriate subdivision of data. For purposes of illustration, a circular track from a disk drive memory system has been illustrated as linear in nature.

In the depicted embodiment of FIG. 3, the designated segment of data has been subdivided into smaller portions of data. Thus, for purposes of illustration, each sub-block of data is followed by a logical Error Correction Code (ECC) which has been calculated based upon the content of the data within that subblock. By "logical" Error Correction Code (ECC), what is meant is an Error Correction Code (ECC) which is germane to a particular area of information which is utilized to determine the validity of the data contained with that area.

Thus, as depicted within FIG. 3, each subblock of data has associated with it a logical Error Correction Code (ECC) 32. of course, the content of each logical Error Correction Code (ECC) 32 will differ in variation with the content of each subblock of data. Similarly, an overall block logical Error Correction Code (ECC) 34 may be calculated and utilized for a group of sub-blocks of data in the manner depicted within FIG. 3. In this manner, each block of data will include logical Error Correction Codes (ECC) for subblocks contained therein which may be utilized to determine the validity of data stored within a specified span of the data segment.

Next, in accordance with an important feature of the present invention, the data segment illustrated within FIG. 3 is then coupled to a head/disk assembly for storage with magnetic media in a manner similar to that depicted within FIG. 2. In accordance with the description of FIG. 2, a segment, track, sector, block or the like which is written to the magnetic media within head/disk assembly 14 will have associated therewith a physical Error Correction Code (ECC) 36 which is calculated within the head-disk assembly in manner which is transparent to the control circuitry. By "physical" Error Correction Code (ECC) what is meant is an Error Correction Code (ECC) which spans an arbitrary physical boundary which is utilized to determine when maintenance of the physical recording media is required. It should be noted that physical Error Correction Code (ECC) 36 will be calculated based on the content of data with that arbitrary physical boundary and the logical Error Correction Code (ECC) which are contained therein, as these logical Error Correction Code (ECC) will appear to the head/disk assembly as data to be stored.

Figure 4:
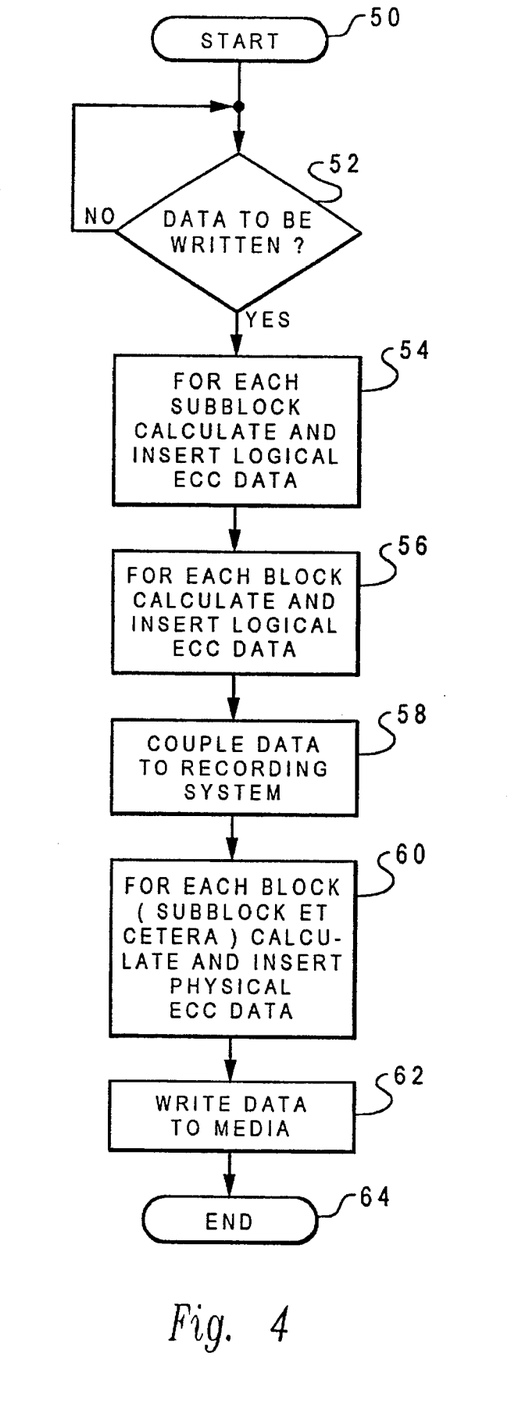
FIG. 4 is a high level logic flowchart which illustrates a process for insertion of logical and physical Error Correction Codes (ECC) within a data segment in accordance with the method and system of the present invention.

Referring now to FIG. 4, there is illustrated a high level logic flowchart which depicts the insertion of logical and physical Error Correction Codes (ECC) within a data segment in accordance with the method and system of the present invention. This process begins at block 50 and thereafter passes to block 52. Block 52 illustrates a determination of whether or not data is to be written. If no data is to be written the process merely iterates until such time as data is coupled to the storage subsystem for writing to a head/disk assembly.

Next, after data has been coupled to storage subsystem 12 (see FIG. 2) for storage within a head/disk assembly, the process passes to block 54. Block 54 illustrates the calculation and insertion of a logical Error Correction Code (ECC) data for each subblock of data within the data segment. Next, the process passes to block 56 which depicts the calculation and insertion of logical Error Correction Code (ECC) data for each block of data within the data segment.

Thereafter, the data and the associated inserted logical

Error Correction Code (ECC) are coupled to the recording system as depicted at block 58. Block 60 then illustrates the calculation and insertion of physical Error Correction Code (ECC) data based upon the content of each block, segment, track, sector or the like which is coupled to the recording system. As noted above, the physical Error Correction Code (ECC) data is calculated based upon not only the content of data within that segment of data but also the content of the logical Error Correction Code (ECC) data within that segment. Next, the process passes to block 62 which illustrates the writing of the data and physical Error Correction Code (ECC) to the media and the process then terminates, as depicted at block 64.

Figure 5:
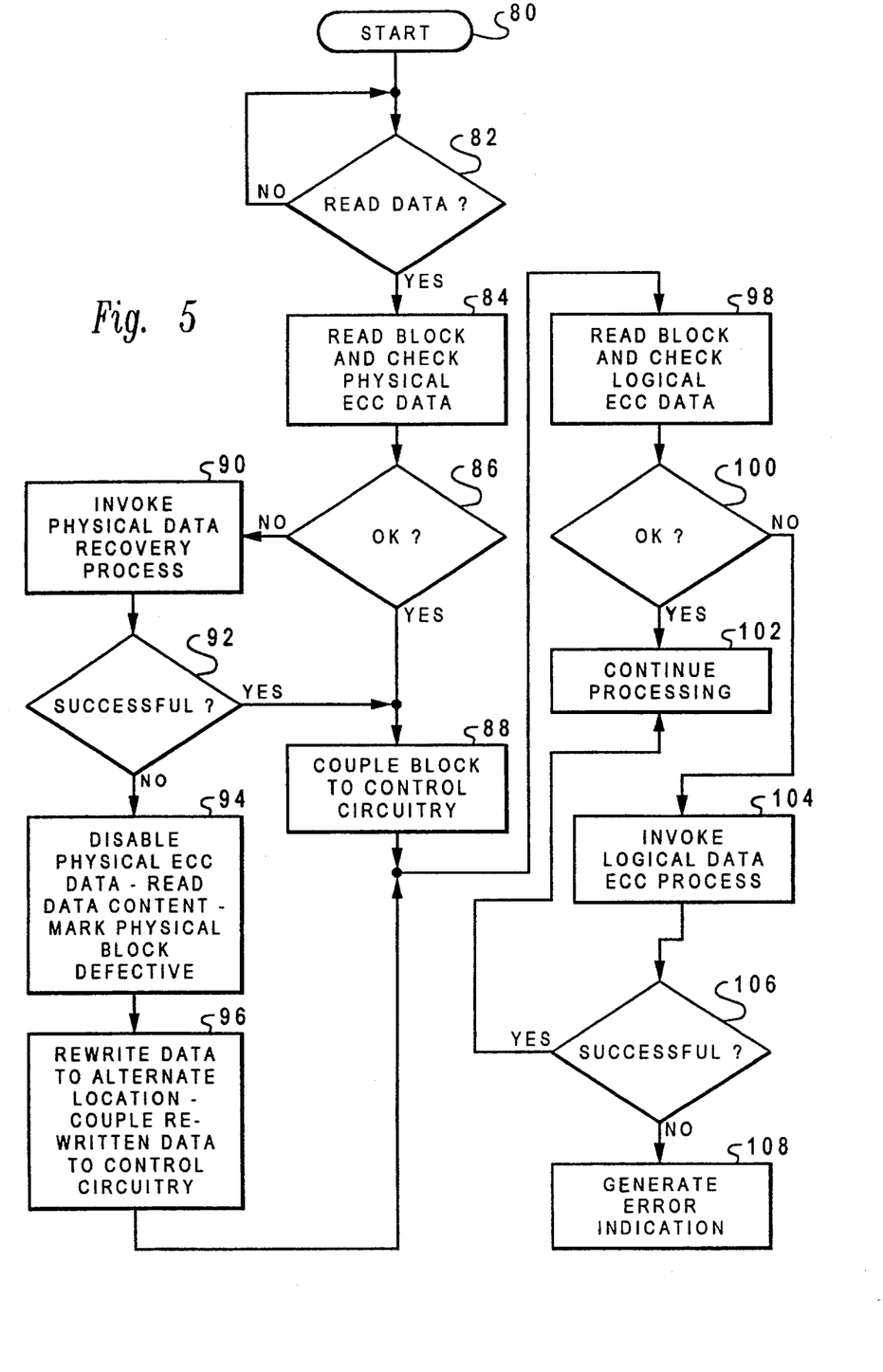
FIG. 5 is a high level logic flowchart which illustrates the separate maintenance of storage media and data within a storage subsystem in accordance with the method and sys-

Finally, with reference to FIG. 5, there is depicted a high level logic flowchart which illustrates the separate maintenance of storage media and data within a storage subsystem in accordance with the method and system of the present invention. As depicted, this process begins at block 80 and thereafter passes to block 82. Block 82 illustrates a determination of whether or not data within the storage subsystem is to be read. If not, the process merely iterates until such time as it is invoked by the reading of data from the storage subsystem.

Still referring to block 82, in the event data is to be read from the storage subsystem, the process passes to block 84. Block 84 illustrates the reading of a block of data from the storage subsystem and the checking of the physical Error Correction Code (ECC) data. As set forth above, those skilled in the art will appreciate that by "block" what is meant by any physically manipulatable segment of data, such as a block, subblock, sector, track, segment or the like. The process then passes to block 86 which depicts a determination of whether or not the physical Error Correction Code (ECC) data indicates that the data within that block is error free. If so, the process passes to block 88 which depicts the coupling of that block of data to the control circuitry for utilization.

Referring again to block 86, in the event the physical error correction codes indicate the likelihood of an error within the block read from the data storage subsystem, the process passes to block 90. Block 90 illustrates the invocation of the physical data recovery process which, as those skilled in the art will appreciate, may include an attempted reread of that block, variations in the parameters utilized to read that block of data, such as skew or the like, or any other known physical data recovery process. Next, the process passes to block 92. In the event the physical data recovery process was successful, the process then passes to block 88, as described above, and that block of data is coupled to the control circuitry for utilization.

Referring again to block 92, in the event the physical data recovery process has not been successful, the process passes to block 94. Block 94 illustrates the disabling of the physical Error Correction Code (ECC) data for that block, the reading of the content of that block and the marking of that block as defective within the storage subsystem. The process then passes to block 96. Block 96 illustrates the rewriting of the data within that defective block to an alternate location and the coupling of the rewritten data to the control circuitry.

Next, after successfully reading a block of data from the storage subsystem, successfully invoking the physical data recovery process or after rewriting the data within a defective block to an alternate location, the process passes to block 98 which illustrates the reading of that block of data and the checking of the logical Error Correction Code (ECC) data. Thereafter, the process passes to block 100 which illustrates a determination as to whether the logical Error Correction Code (ECC) data indicates that the data read is error free. It should be noted that despite the presence of an error indicated by the physical Error Correction Code (ECC) data, the data contained within that block may be accurate in view of the fact that the error may have the data storage subsystem, the process passes to block 90. Block 90 illustrates the invocation of the physical data recovery process which, as those skilled in the art will appreciate, may include an attempted reread of that block, variations in the parameters utilized to read that block of data, such as skew or the like, or any other know physical data recovery process. Next, the process passes to block 92. In the event the physical data recovery process was successful, the process then passes to block 88, as described above, and that block of data is coupled to the control circuitry for utilization.

Referring again to block 92, in the event the physical data recovery process has not been successful, the process passes to block 94. Block 94 illustrates the disabling of the physical Error Correction Code (ECC) data for that block, the reading of the content of that block and the marking of that block as defective within the storage subsystem. The process then passes to block 96. Block 96 illustrates the rewriting of the data within that defective block to an alternate location and the coupling of the rewriten data to the control circuitry.

Next, after successfully reading a block of data from the storage subsystem, successfully invoking the physical data recovery process or after rewriting the data within a defective block to an alternate location, the process passes to block 98 which illustrates the reading of that block of data and the checking of the logical Error Correction Code (ECC) data. Thereafter, the process passes to block 100 which illustrates a determination as to wheter the logical Error Correction Code (ECC) data indicates that the data read is error free. It should be noted that despite the presence of an error indicated by the physical Error Correction Code (ECC) data, the data contained within that block may be accurate in view of the fact that the error may have occurred within a nonsubstantive portion of that block, such as, the space between two data segments or the like. In the event the logical Error Correction Code (ECC) data indicates no errors, the process passes to block 102 which depicts the continuing of the processing of that data.

Still referring to block 100 in the event the logical Error Correction Code (ECC) data indicates an error within the block of data the process passes to block 104. Block 104 illustrates the invocation of the logical data Error Correction Code (ECC) process. Those skilled in the art will appreciate that such processes are capable of correcting for a plurality of erroneous bits within the data, dependent upon the power and capability of the Error Correction Code (ECC) process utilized. The process then passes to block 106. Block 106 illustrates a determination of whether or not the logical data Error Correction Code (ECC) process was successful, and if so, the process returns to block 102 to continue processing in the manner described above. Alternately, in the event the logical data Error Correction Code (ECC) process was not successful, the process passes to block 108 which indicate the generation of an error indication.

Upon reference to the foregoing those skilled in the art will appreciate that by calculating and inserting two diverse types of Error Correction Codes (ECC) within data to be stored in the manner described within the present application, the physical media maintenance and logical data maintenance within a data storage subsystem may be successfully isolated from each other. That is, an error caused by a defect within a track, sector, block or the like within the storage media of a data storage subsystem which, prior to this invention, would result in the presumed corruption of all data within that portion of the data, may be overcome by the processing of logical Error Correction Code (ECC) data within that segment of data which are separately processed. Thus, in the event that logical Error Correction Code (ECC) data are inserted with greater frequency than physical Error Correction Code (ECC) data or to the extent that one Error Correction Code (ECC) process is more powerful than the other Error Correction Code (ECC) process the amount of data lost due to physical media maintenance may be substantially reduced.

While the invention has been particularly shown and described with reference to a preferred embodiment, it will be understood by those skilled in the art that various changes in form and detail may be made therein without departing from the spirit and scope of the invention.

I claim:

1. A method for enhanced maintenance of data stored on the storage media within a data processing system storage subsystem, said method comprising the steps of:

calculating and inserting a plurality of logical error correction codes based upon a content of said data at selected locations within said data prior to storage of said data;

during storage of said data and said plurality of logical error correction codes, calculating and inserting at selected locations within said data and said plurality of logical error correction codes a plurality of physical error correction codes, each of said plurality of said physical error correction codes based upon a content of both said data and said plurality of logical error correction codes; and maintaining said data within said data processing system storage subsystem utilizing both said plurality of logical error correction codes and said plurality of physical error correction codes.

2. The method for enhanced maintenance of data stored on storage media within a data processing system storage subsystem according to claim 1, wherein said data processing system storage subsystem includes control circuitry and a head-disk assembly for storing blocks of data, each block of data comprised of a plurality of subblocks of data, and wherein said step of calculating and inserting a plurality of logical error correction codes based upon said content of data at selected locations within said data comprises the step of calculating and inserting a logical error correction code (ECC) within each subblock of data utilizing said control circuitry.

3. The method for enhanced maintenance of data stored on storage media within a data processing system storage subsystem according to claim 2, wherein said step of calculating and inserting at selected locations within said data and said plurality of logical error correction codes a plurality of physical error correction codes, each of said plurality of physical error correction codes based upon said content of both said data and said plurality of logical error correction codes comprises the step of calculating and inserting a physical error correction code (ECC) within each block of data during storage thereof utilizing said head-disk assembly.

4. A data processing system for permitting enhanced maintenance of data stored therein, said data processing system comprising:

a host processor;

a data storage subsystem, said data storage subsystem comprising:

a control circuit for calculating and inserting a plurality of logical error correction codes at selected locations within said data based upon a content of said data prior to storage thereof;

a storage device which includes storage media; and a physical error correction code logic circuit for calculating and inserting at selected locations within said data and said plurality of logical error correction codes a plurality of physical error correction codes, each of said plurality of physical error correction codes based upon said content of both said data and said plurality of logical error correction codes in response to storage of said data and said plurality of logical error correction codes within said storage media.

5. The data processing system according to claim 4, wherein said storage device comprises a direct access storage device.

6. The data processing system according to claim 5, wherein said data storage subsystem includes a head-disk assembly.

7. The data processing system according to claim 4, wherein said data storage subsystem comprises means for storing blocks of data, each block of data comprising a plurality of subblocks and wherein said control circuit comprises means for calculating and inserting a logical error correction code within each subblock of data.

8. The data processing system according to claim 7, wherein said physical error correction code logic circuit comprises means for calculating and inserting at selected locations within said data and said plurality of logical error correction codes a plurality of physical error correction codes, each of said plurality of physical error correction codes based upon said data and said plurality of logical error correction codes comprises the step of calculating and inserting a physical error correction code within each block of data during storage thereof.

9. A data storage subsystem, said data storage subsystem comprising:

a control circuit for calculating and inserting a plurality of logical error correction codes at selected locations within said data based upon a content of said data prior to storage thereof;

a storage device which includes storage media; and a physical error correction code logic circuit for calculating and inserting at selected locations within said data and said plurality of logical error correction codes a plurality of physical error correction codes, each of said plurality of physical error correction codes based upon said content of both said data and said plurality of logical error correction codes in response to storage of said data and said plurality of logical error correction codes within said storage media.

10. The data processing system according to claim 9, wherein said storage device comprises a direct access storage device.

11. The data processing system according to claim 10, wherein said data storage subsystem includes a head-disk assembly.

12. The data processing system according to claim 9, wherein said data storage subsystem comprises means for storing blocks of data, each block of data comprising a plurality of subblocks and wherein said control circuit comprises means for calculating and inserting a logical error correction code within each subblock of data.

13. The data processing system according to claim 12, wherein said physical error correction code logic circuit comprises means for calculating and inserting at selected locations within said data and said plurality of logical error correction codes a plurality of physical error correction codes, each of said plurality of physical error correction codes based upon said data and said plurality of logical error correction codes comprises the step of calculating and inserting a physical error correction code within each block of data during storage thereof.

14. A data processing program product, including instructions which implement specific operations and are stored as unique data structures on a computer readable media within a data processing system storage subsystem, for enhanced maintenance of data stored on storage media within said data processing system storage subsystem, said data processing program product comprising:

means, implemented by said instructions for calculating and inserting a plurality of logical error correction codes based upon a content of said data at selected locations within said data prior to storage of said data;

means, implemented by said instructions, for calculating and inserting at selected locations within said data and said plurality of logical error correction codes during storage of said data and said plurality of logical error correction codes a plurality of physical error correction codes, each of said plurality of physical error correction codes based upon a content of both said data and said plurality of logical error correction codes; and means, implemented by said instructions for maintaining said data within said data processing system storage subsystem utilizing both said plurality of logical error correction codes and said plurality of physical error correction codes.

* * * * *